United States Patent
Frenger et al.

(10) Patent No.: US 8,295,848 B2
(45) Date of Patent: Oct. 23, 2012

(54) METHOD AND ARRANGEMENT FOR AUTOMATIC TUNING OF THE RACH CONFIGURATION IN A WIRELESS COMMUNICATION NETWORK

(75) Inventors: Pål Frenger, Linköping (SE); Mehdi Amirijoo, Linköping (SE); Fredrik Gunnarsson, Linköping (SE); Kristina Zetterberg, Linköping (SE); Johan Moe, Mantorp (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 112 days.

(21) Appl. No.: 13/001,032

(22) PCT Filed: Jul. 2, 2008

(86) PCT No.: PCT/SE2008/050823
§ 371 (c)(1),
(2), (4) Date: Dec. 22, 2010

(87) PCT Pub. No.: WO2010/002301
PCT Pub. Date: Jan. 7, 2010

(65) Prior Publication Data
US 2011/0098035 A1 Apr. 28, 2011

(51) Int. Cl.
*H04W 40/00* (2009.01)
(52) U.S. Cl. ............... 455/446; 455/422.1; 455/423; 455/453
(58) Field of Classification Search ............ 455/422.1, 455/423, 446, 453
See application file for complete search history.

(56) References Cited

U.S. PATENT DOCUMENTS
2008/0075043 A1* 3/2008 Wang et al. ............ 370/330

FOREIGN PATENT DOCUMENTS
WO WO 2008/041916 4/2008

OTHER PUBLICATIONS

"RACH Design for EUTRA" 3GPPP TSG RAN1#44, R1-060387, Denver USA; Feb. 13-17, 2006, 11 pages.
"Summary of Email Discussion on RACH Load eNB Measurement" 3GPP TSG RAN WG2 #60, Tdoc-R2-075152, Juju, Korea, Nov. 5-9, 2007, pp. 1-5.
International Search Report for PCT/SE2008/050823, dated Apr. 7, 2009.
International Preliminary Report on Patentability for PCT/SE2008/050823, dated Jul. 1, 2010.

* cited by examiner

*Primary Examiner* — Charles Appiah
*Assistant Examiner* — Jaime Holliday
(74) *Attorney, Agent, or Firm* — Myers Bigel Sibley & Sajovec, P.A.

(57) ABSTRACT

The present invention relates to a method and a communication network node for automatically tuning a PRACH configuration parameter in a communication network system comprising radio base stations each serving at least one cell and with which user equipments are communicating on uplink and downlink channels. The PRACH configuration parameter is used for defining the division of uplink resource blocks between PRACH and PUSCH. Load statistics on RACH and PUSCH are collected used for determining a number of RACH opportunities required per time unit. Then a new PRACH configuration parameter having said required number of RACH opportunities per time unit is selected which is replacing the old PRACH configuration parameter.

12 Claims, 6 Drawing Sheets

METHOD AND ARRANGEMENT FOR AUTOMATIC TUNING OF THE RACH CONFIGURATION IN A WIRELESS COMMUNICATION NETWORK

CROSS-REFERENCE TO RELATED APPLICATIONS

This application is a 35 U.S.C. §371 national stage application of PCT International Application No. PCT/SE2008/050823, filed on Jul. 2, 2008, the disclosure and content of which is incorporated by reference herein in its entirety. The above-referenced PCT International Application was published in the English language as International Publication No. WO 2010/002301 on Jan. 7, 2010.

TECHNICAL FIELD

The present invention relates to a method and a communication network node in a communication network system and, more particular, to a communication network node allowing for automatically tuning a random access channel configuration parameter as well as a method for such automatic tuning.

BACKGROUND

The demand for wireless data services, such as text messaging (SMS), multi-media messaging (MMS), mobile video and IPTV, demanding higher bandwidth is growing quickly. The third generation partnership project (3GPP) is developing the third generation mobile systems based on evolved GSM core networks. The radio access technology UMTS terrestrial radio access (UTRA) and has come up with a new orthogonal frequency division multiple access (OFDMA) based technology through the long term evolution (LTE) work, which provides a very efficient wireless solution. The OFDMA based air interface is often referred to as the evolved UMTS terrestrial radio access network (E-UTRAN).

During initial access, the user equipment (UE) seeks access to the network in order to register and commence services. The random access (RA) serves as an uplink control procedure to enable the UE to access the network. Since the initial access attempt cannot be scheduled by the network, the RA procedure is by definition contention based. Collisions may occur and an appropriate contention-resolution scheme needs to be implemented. Including user data on the contention-based uplink is not spectrally efficient due to the need for guard periods and retransmissions. Therefore, it has been decided to separate the transmission of the random access burst (preamble), whose purpose is to obtain uplink synchronization, from the transmission of user data.

The RA procedure serves two main purposes:
  It lets the UE align its uplink (UL) timing to that expected by the eNode B in order to minimize interfering with other UEs transmissions. UL time alignment is a requirement in E-UTRAN before data transmissions may commence.
  It provides means for the UE to notify the network of its presence and enables the eNode B to give the UE initial access to the system.

The so-called Physical Random Access Channel (PRACH) is a UMTS uplink common physical channel, i.e. it is shared between all user equipments within a cell. Each user equipment in the cell utilizes the PRACH to send signaling information such as a call origination requests to the E-UTRAN and, if necessary, a small amount of user data, such as short messages, alphanumerical texts, and so on.

The PRACH configuration (see table below) is a parameter that needs to be set in each cell.

TABLE 1

PRACH configurations in LTE showing number of RACH opportunities per 20 ms for each configuration.

| PRACH configuration | System frame number | Sub-frame number | $N_{RACH}$ per 20 ms |
|---|---|---|---|
| 0 | Even | 1 | 1 |
| 1 | Even | 4 | 1 |
| 2 | Even | 7 | 1 |
| 3 | Any | 1 | 2 |
| 4 | Any | 4 | 2 |
| 5 | Any | 7 | 2 |
| 6 | Any | 1, 6 | 4 |
| 7 | Any | 2, 7 | 4 |
| 8 | Any | 3, 8 | 4 |
| 9 | Any | 1, 4, 7 | 6 |
| 10 | Any | 2, 5, 8 | 6 |
| 11 | Any | 3, 6, 9 | 6 |
| 12 | Any | 0, 2, 4, 6, 8 | 10 |
| 13 | Any | 1, 3, 5, 7, 9 | 10 |
| 14 | Any | 0, 1, 2, 3, 4, 5, 6, 7, 8, 9 | 20 |
| 15 | Even | 9 | 1 |

Figure 2:
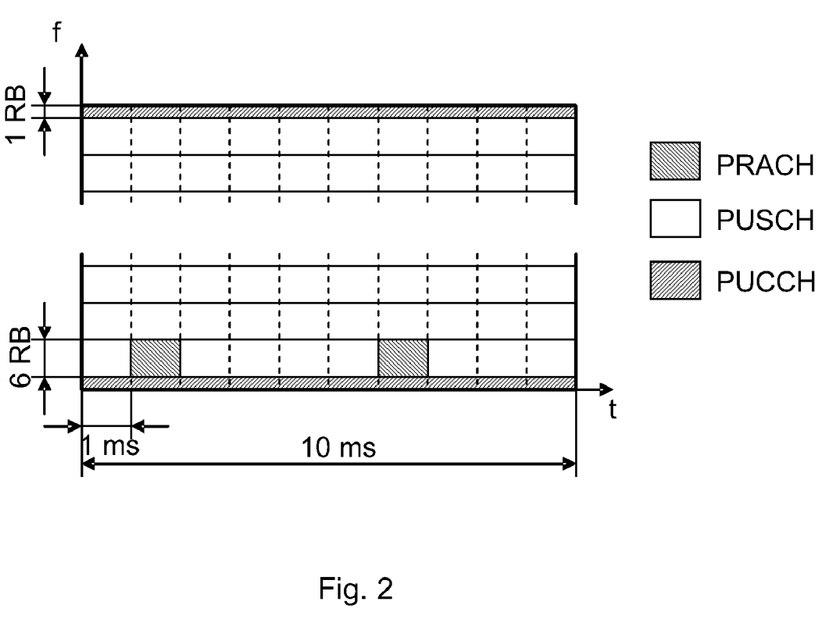
FIG. 2 shows the time-frequency structure of the PRACH configuration no. 6 in table 1.

An example depicting the PRACH configuration no. 6 according to table 1 is illustrated in FIG. 2, where the time and frequency configuration of the PRACH, the physical uplink shared channel (PUSCH), and the physical uplink control channel (PUCCH) in the LTE uplink is shown. In this example, two RA opportunities with 1 ms length exist in each frame, which means four RA opportunities per 20 ms. According to 3GPP, the bandwidth of a random access opportunity is 1.08 MHz which corresponds to 6 resource blocks (RB).

If the physical RACH configuration contains too few RACH opportunities then the UEs will often collide on the RACH. A RACH collision occurs when two or more UEs transmit on the RACH simultaneously using the same RACH preamble. In that case the eNB cannot separate between the two transmitted signals and at most one of the UEs can succeed with the RACH transmission attempt. Also, in addition to the RACH collisions, the load on the RACH in a cell may become too high, causing power limited UEs to experience an interference level on the RACH that they have difficulties to overcome. Since RACH preambles derived from different root sequences are non-orthogonal, each UEs transmitting a RACH preamble will cause interference to other UEs that have selected another RACH preamble derived from another root sequence. Thus, too few RACH opportunities in a cell cause problems with RACH collisions and may also result in a high RACH interference level.

If the RACH configuration contains too many RACH opportunities, then obviously the above mentioned problems would be solved. However, the RACH uses the same physical uplink resource as the PUSCH. Hence each time-and-frequency resource spent on RACH reduces the amount of time-and-frequency resources that can be spent on the PUSCH. There is clearly a trade-off here between RACH capacity and PUSCH capacity.

Traditionally, manual cell planning procedures are used to set the RACH configuration parameter. It is an objective of the disclosed invention to enable automatic tuning of RACH related parameters in a way that allows for a trade-off between RACH load and user-plane load.

SUMMARY

Accordingly, one objective with the present invention is to provide an improved method and communication network node for automatically tuning a physical random access channel configuration parameter in a communication network system comprising radio base stations each serving at least one cell and with which user equipments are communicating on uplink and downlink channels. The physical random access channel configuration parameter is used for defining the division of uplink resource blocks between a physical random access channel and a physical uplink shared channel According to a first aspect of the present invention this objective is achieved through a method as defined in the characterising portion of claim 1, which specifies that a physical random access channel configuration parameter is automatically tuned by a method which iteratively performs the steps of: collecting load statistics on a random access channel and said physical uplink shared channel; determining a number of random access channel opportunities required per time unit using said collected statistics; selecting a new physical random access channel configuration parameter having said required number of random access channel opportunities per time unit; and, replacing an old physical random access channel configuration parameter with said selected new physical random access channel configuration parameter.

According to a second aspect of the present invention this objective is achieved through an arrangement as defined in the characterising portion of claim 9, which specifies that a physical random access channel configuration parameter is automatically tuned by a communication network node comprises a processing unit arranged to iteratively perform the steps of: collecting load statistics on a random access channel and said physical uplink shared channel; determining a number of random access channel opportunities required per time unit using said collected statistics; selecting a new physical random access channel configuration parameter having said required number of random access channel opportunities per time unit; and, replacing said original physical random access channel configuration parameter with said new physical random access channel configuration parameter.

Further embodiments are listed in the dependent claims.

Thanks to the provision of a method and a communication network node, which automatically tune a physical random access channel configuration parameter a trade-off between the RACH capacity and the PUSCH capacity is allowed.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views:

FIG. 5 is a flowchart illustrating a process used to determine a required number of RACH opportunities, which corresponds to FIG. 4a;

DETAILED DESCRIPTION

Figure 1:
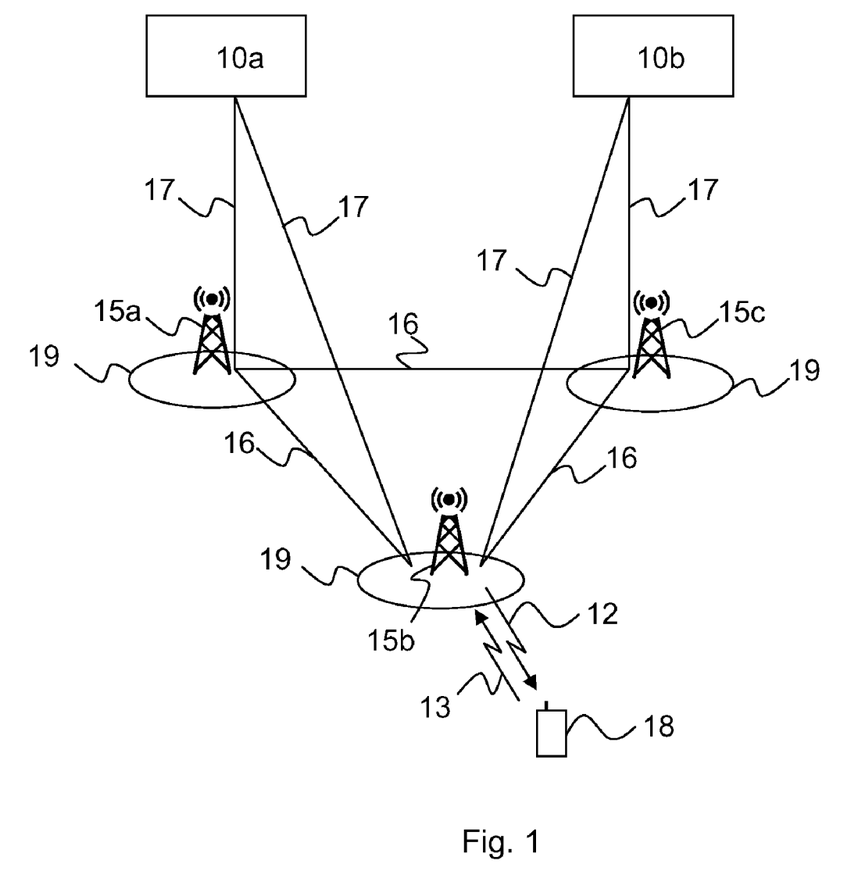
FIG. 1 shows a communication network architecture according to the present invention.

A communication system, such as a Long Term Evolution (LTE) system is shown in FIG. 1, including a Radio Access Network (RAN), comprising at least one Radio Base Station (RBS), which in the LTE system is called eNode B (eNB) 15a, 15b and 15c. The eNBs are connected over an interface such as the S1-interface 17 to at least one server gateway and mobility management entity node (S-GW/MME) 10a and 10b. The S-GW/MME node handles control signalling for instance for mobility, and is connected to external networks (not shown in FIG. 1) such as the Public Switched Telephone Network (PSTN) or the Integrated Services Digital Network (ISDN), and/or a connectionless external network as the Internet.

The RAN provides communication and control for a plurality of user equipments (UE) 18 (only one shown in FIG. 1) and each eNB 15a-15c is serving at least one cell 19 through and in which the UEs 18 are moving. The eNBs 15a-15c are communicating with each other over a communication interface 16, such as X2. The UEs each uses downlink (DL) channels 12 and uplink (UL) channels 13 to communicate with at least one eNB over a radio or air interface.

According to a preferred embodiment of the present invention, the communication system is herein described as a LTE system. The skilled person, however, realizes that the inventive method and arrangement work very well on other communications systems as well, where random access and data channel resources are shared in a similar time/frequency manner. The user equipments may be mobile stations such as mobile telephones ("cellular" telephones) and laptops with mobile termination and thus can be, for example, portable, pocket, hand-held, computer-included or car-mounted mobile devices which communicate voice and/or data with the RAN.

One embodiment of the invention is to automatically select a RACH configuration based on the RACH load and the UL user plane load. By estimating the RACH load ($L_{RACH}$) and the user-plane load ($L_{PUSCH}$) it is possible to decide how much RACH resources that are needed to spend in each cell.

Thus the problem of selecting RACH configuration according to table 1 is divided into two parts. First it is decided how many RACH opportunities ($N_{RACH-required}$) that is needed to have per time unit (e.g. 20 ms) in a cell. This decision is based on the RACH load and the user plane load. Then, in case there is more than one RACH configuration with the required number of RACH opportunities per time unit, which configuration to use among the valid candidates according to different possible criteria is selected. This will be further described below.

In case RACH reconfiguration is required, then during the time it takes to reconfigure the RACH (i.e. change the RACH configuration parameter on the broadcast channel and wait until all UEs have decoded the new RACH configuration) the eNB accepts RACH transmissions according to both the old and the new configurations.

Figure 3:
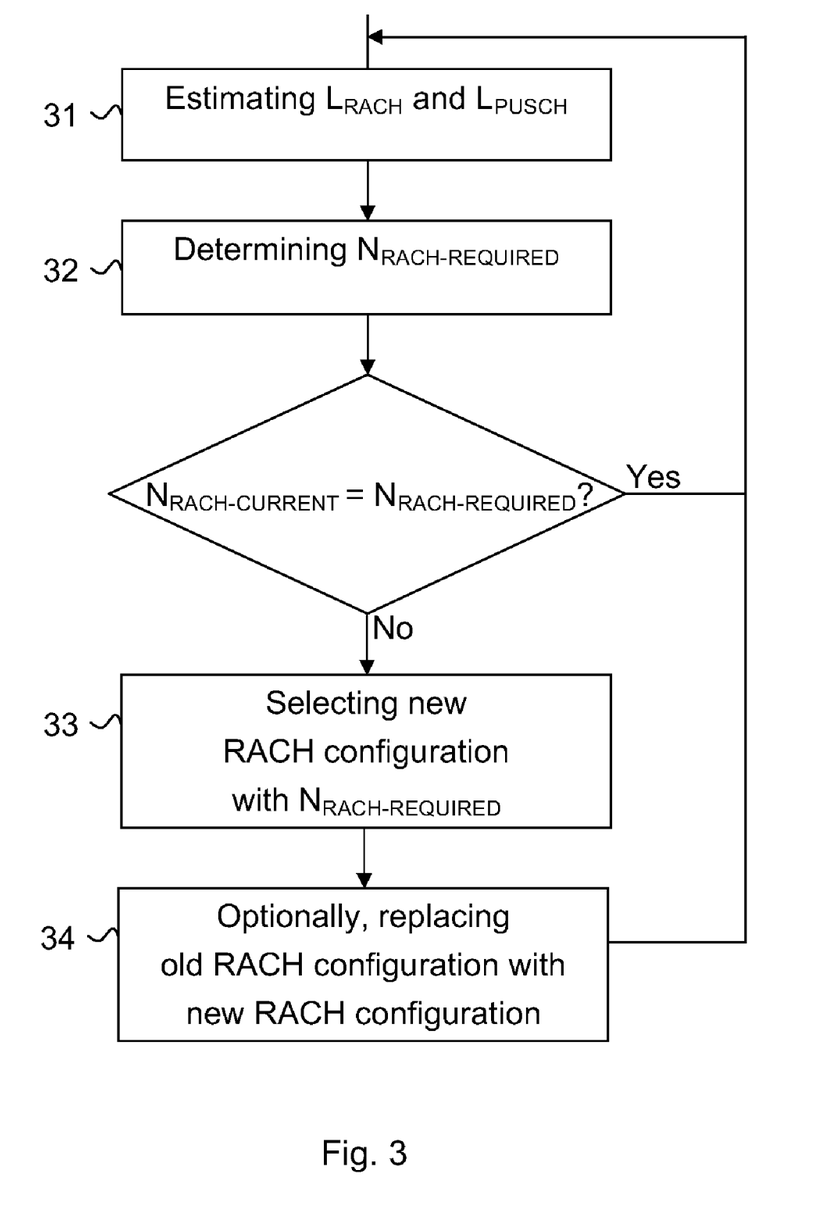
FIG. 3 is a flowchart illustrating a general embodiment of the present invention.

Thus, according to a general embodiment of the present invention the procedure for automatically tuning a random access channel configuration parameter in a communication network system comprising radio base stations each serving at least one cell and with which user equipments are communicating on uplink and downlink channels, shown in FIG. 3, is as follows:
- collecting load statistics on the random access channel and on a physical uplink shared channel by estimating $L_{RACH}$ and $L_{PUSCH}$ (step 31), which is described in more detail further below;
- determining a number of random access channel opportunities required per time unit using said collected statistics (step 32), described in more detail below;
- selecting a new random access configuration parameter having said required number of random access channel opportunities per time unit (step 33);
- replacing said old random access channel configuration parameter with said selected new random access channel configuration parameter (step 34).

Estimating $L_{RACH}$ and $L_{PUSCH}$

An uplink resource block not used for PUCCH may be used for transmission of RACH or PUSCH. If $N_{PRB}$ denotes the total number of uplink physical resource blocks (PRBs) available for PUCCH, RACH, and PUSCH, in a given time interval (e.g. 20 ms), it is noted that $$N_{PRB}=6 \times n_{RACH} \times N_{RACH}+N_{PUSCH}+N_{PUCCH}$$

where $n_{RACH}$ is the number of slots per RACH opportunity, $N_{RACH}$ is the number of RACH opportunities in the given time duration, $N_{PUSCH}$ is the number of resource blocks available for PUSCH in the given time interval, and $N_{PUCCH}$ is the number of resource blocks assigned to PUCCH transmissions in the given time interval. The number of slots per RACH opportunity ($n_{RACH}$) may be 2, 4, or 6, corresponding to a 1, 2, or 3 sub-frame duration of each RACH opportunity respectively. For each given value of $N_{PUCCH}$ the remaining available resource blocks are shared between RACH and PUSCH.

The estimated RACH usage ($U_{RACH}$) should capture the expected number of RACH preambles transmitted in a cell in a given time interval (e.g. per 20 ms). This measure could be estimated by the eNB or it could be based on UEs reporting the number of RACH attempts to the eNB. The value of $U_{RACH}$ used to dimension the amount of physical resources that needs to be spent on the RACH should typically not be the expected average value but rather the expected x-percentile value where x is e.g. 95 or 99.

It is important that any estimation of $U_{RACH}$ is performed with sufficient amount of low pass filtering or averaging to avoid adapting to instantaneous changes rather than long term trends.

By dividing the estimated RACH usage with the number of RACH opportunities ($N_{RACH}$) in the same time interval, the normalized estimated RACH load is obtained, denoted $$L_{RACH}=U_{RACH}/N_{RACH}.$$

Thus if the RACH configuration in a cell is changed, the number of RACH attempt per time unit ($U_{RACH}$) should remain approximately constant, but the normalized RACH load could change if the new RACH configuration contains a different number of RACH opportunities per time unit ($N_{RACH}$) than the old one.

This is however only approximately true. In case the old RACH configuration was insufficient and there were a large number of RACH collisions causing a large number of RACH retransmissions while, with the new RACH configuration these retransmissions disappear, then the RACH usage is also affected. This effect could be compensated for, but in order to simplify the presentation here it will be assumed that the RACH usage stays approximately constant when changing from one RACH configuration to a new RACH configuration for which the $N_{RACH}$ value is increased or decreased in as small steps as possible.

Similarly, the user plane usage $U_{PUSCH}$ should capture the expected number of scheduled resource blocks in a given time interval (preferably the same as for $U_{RACH}$). The normalized user plane load $L_{PUSCH}$ is obtained by dividing $U_{PUSCH}$ with the number of resource blocks available for PUSCH over the same time interval ($N_{PUSCH}$), i.e.

$$L_{PUSCH}=U_{PUSCH}/N_{PUSCH}.$$

Thus if the RACH configuration is changed to a new one that has more RACH opportunities than the previous one then the number of resource blocks usable for PUSCH will decrease proportionally. For a system with a small uplink bandwidth this will typically result in a noticeable increase of $L_{PUSCH}$.

In many cases the resources used for the PUSCH carries traffic of different importance. Typically the amount of guaranteed bit rate (GBR) traffic is more important than the amount of best effort (BE) traffic, especially in relation to RACH and PUSCH resource usage trade-off. Therefore it may be more advantageous to define $L_{PUSCH}$ as e.g.

$$L_{PUSCH}=\alpha L_{PUSCH\text{-}GBR}+\beta L_{PUSCH\text{-}BE}=\alpha(U_{PUSCH\text{-}GBR}/N_{PUSCH})+\beta(U_{PUSCH\text{-}BE}/N_{PUSCH}),$$

where $\alpha$ and $\beta$ are constant parameter values (typical values could be $\alpha=1$ and $\beta=0.1$).

Determining the Required Number of RACH Opportunities

Let $N_{RACH\text{-}lower}$, $N_{RACH\text{-}current}$, and, $N_{RACH\text{-}higher}$ denote the next smaller number of RACH opportunities per time unit, the current number of RACH opportunities per time unit, and the next larger number of RACH opportunities per time unit, respectively. In case a configuration with the smallest possible number of RACH opportunities already is used, then $N_{RACH\text{-}lower}=N_{RACH\text{-}current}$. Also in case a configuration with the largest possible number of RACH opportunities already is used then $N_{RACH\text{-}higher}=N_{RACH\text{-}current}$.

Note that the smallest number of RACH opportunities may be limited e.g. by a minimum delay requirement. Note also that the largest number of RACH opportunities may be limited e.g. by requiring that at least x% of all resource blocks available for RACH or PUSCH shall be spent on PUSCH.

If the value of $N_{RACH\text{-}required}$ is not equal to $N_{RACH\text{-}current}$ then the RACH configuration should be changed. Algorithms used to select $N_{RACH\text{-}required}$ is more described below and is conceptually depicted in FIGS. 4a and 4b. Depending on in which area $\gamma=L_{RACH}/L_{PUSCH}$ is, the number of required RACH opportunities shall be increased, decreased, or kept constant, respectively.

Figure 4A:
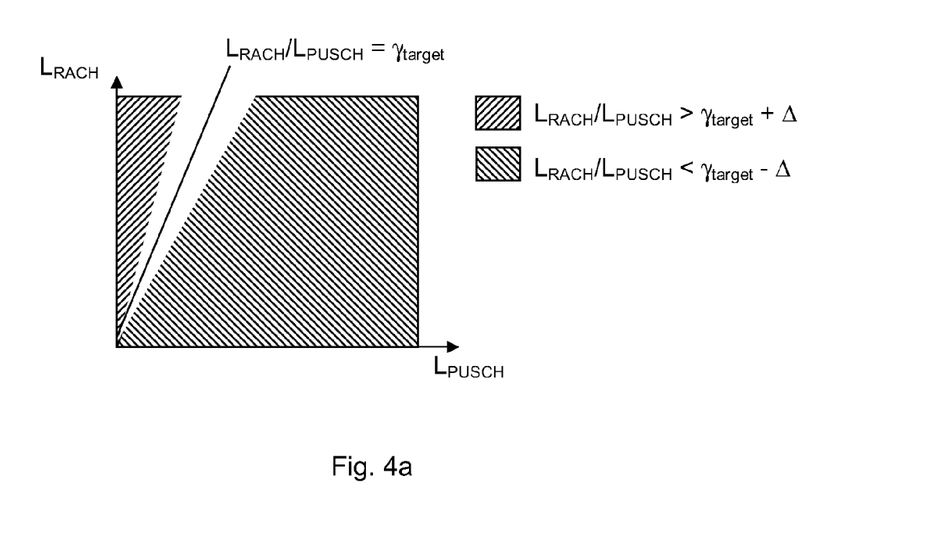
FIG. 4a shows an inventive algorithm used according to an embodiment to determine a required number of RACH opportunities.
Figure 4B:
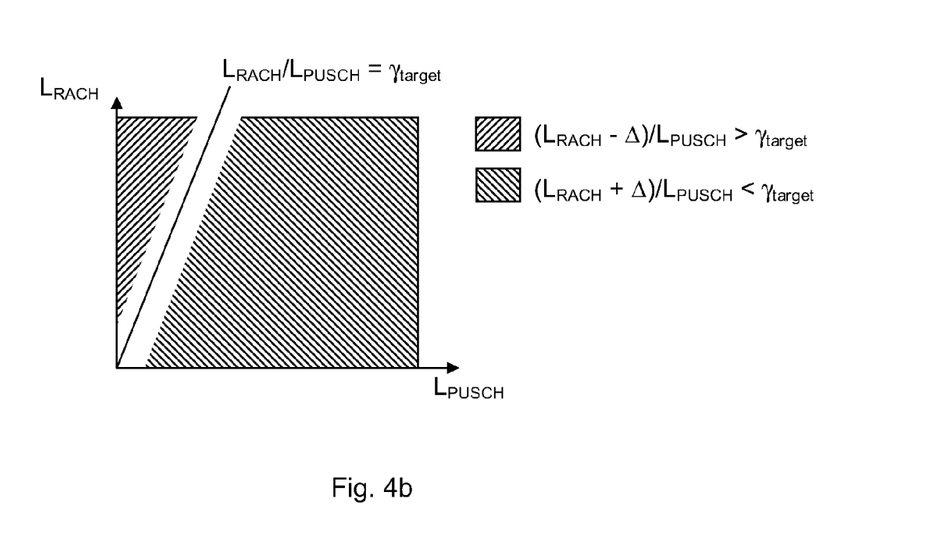
FIG. 4b shows an inventive algorithm used according to another embodiment to determine a required number of RACH opportunities.

In FIG. 4a, a hysteresis offset value $\Delta$ affecting the slope of the target function is used. And in FIG. 4b, which shows an alternative criterion to select $N_{RACH\text{-}required}$, a hysteresis offset value $\Delta$ affecting the vertical shift of the target function is used. It is obvious to anyone skilled in the art that other similar modifications to the decision criterion also may be made.

Figure 5:
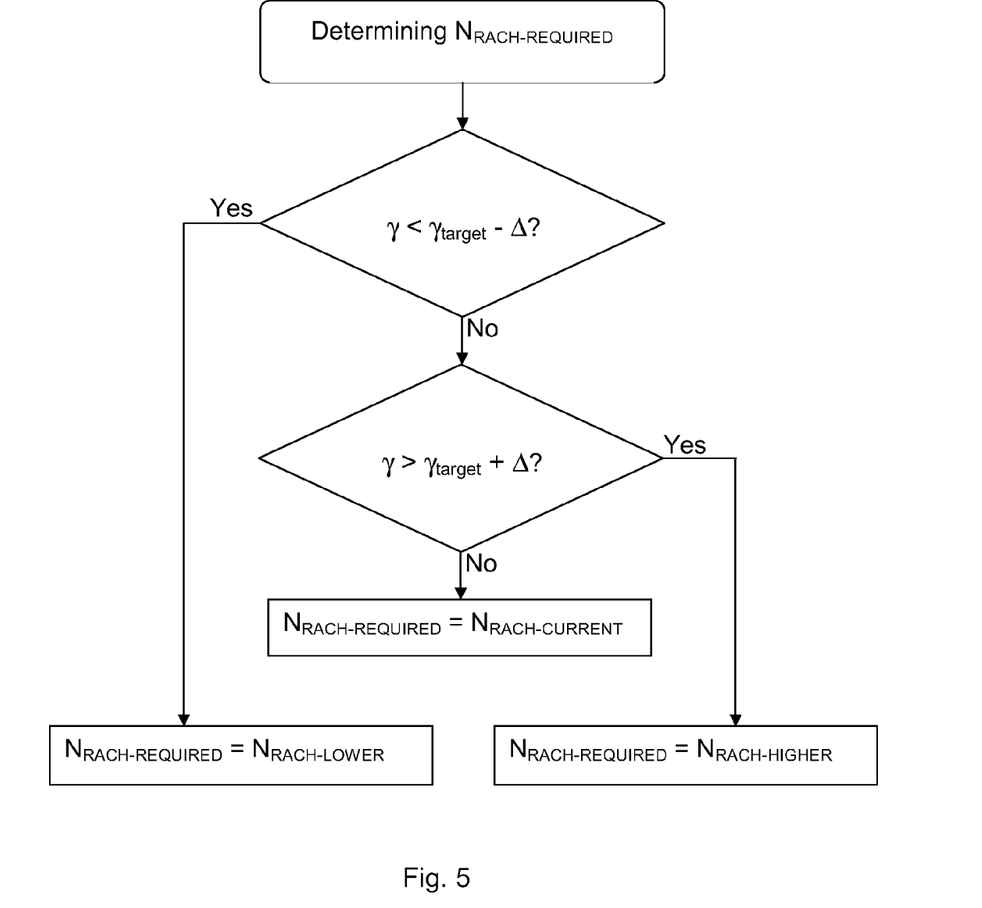

Define the ratio $\gamma=L_{RACH\_L}/L_{PUSCH}$. Let $\gamma_{target}$ be a target threshold and $\Delta \geqq 0$ an offset value. A procedure for determining $N_{RACH\text{-}required}$, is shown in FIG. 5 corresponding to FIG. 4a, for determining if the required number of RACH opportunities per time unit ($N_{RACH\text{-}required}$) shall be decreased, remain constant or be increased. Thus, $N_{RACH\text{-}required}$ is determined as follows:

If ($\gamma < \gamma_{target} - \Delta$) then decrease the number of RACH opportunities per time unit (i.e. set $N_{RACH\text{-}required} = N_{RACH\text{-}lower}$).

else if ($\gamma > \gamma_{target} + \Delta$) then increase the number of RACH opportunities per time unit (i.e. set $N_{RACH\text{-}required} = N_{RACH\text{-}higher}$).

else set $N_{RACH\text{-}required} = N_{RACH\text{-}current}$.

For the algorithm to work it is needed to select an initial configuration. Since the algorithm shown in FIG. 3 is iterative it will eventually converge to a good configuration. To avoid problems, the selection of the initial RACH configuration could be made rather robust. I.e. the initial RACH configuration could be e.g. the configuration with the largest number of RACH opportunities per time unit (i.e. configuration 14, see table 1). Then the algorithm will decrease the number of RACH opportunities until it converges. Alternatively, a configuration with the second largest number of RACH opportunities per time unit (i.e. configuration 12 or 13, see table 1) could be selected initially. In that case the algorithm only has to increase $N_{RACH}$ once, should the initial configuration turn out to be insufficient.

Selecting RACH Configuration

In case there is more than one RACH configuration with the required number of RACH opportunities per time unit, which configuration to use, among the valid candidates, is selected according to one of the following criteria:

Either different cells belonging to the same site are assigned to RACH configurations for which RACH opportunities do not overlap in time. This criterion has two advantages of: Firstly, the RACH detector hardware in a site may be re-used (e.g. a three cell site where the required $N_{RACH}$ equals 6 in all cells may use configurations 9, 10, and 11, see table 1). Secondly, since the RACH opportunities do no overlap in time, the three cells may use the same RACH preamble sequences. Re-using the RACH preambles in cells for which the RACH opportunities do not overlap in time, relaxes the problem of assigning non-colliding RACH sequences to all cells in the system.

Alternatively, each cell may estimate the interference level in the sub-frames corresponding to the different RACH configurations. E.g. in case 4 RACH opportunities is required per 20 ms in a cell, then configurations 6, 7, and 8 of table 1 are valid. By comparing the average received interference level in sub-frames 1 and 6, 2 and 7, 3 and 8 respectively the RACH configuration that is expected to experience the lowest interference level for that particular cell may be selected.

Yet another alternative, is to select a random configuration among the ones that have the required number of RACH opportunities per time unit.

Figure 6:
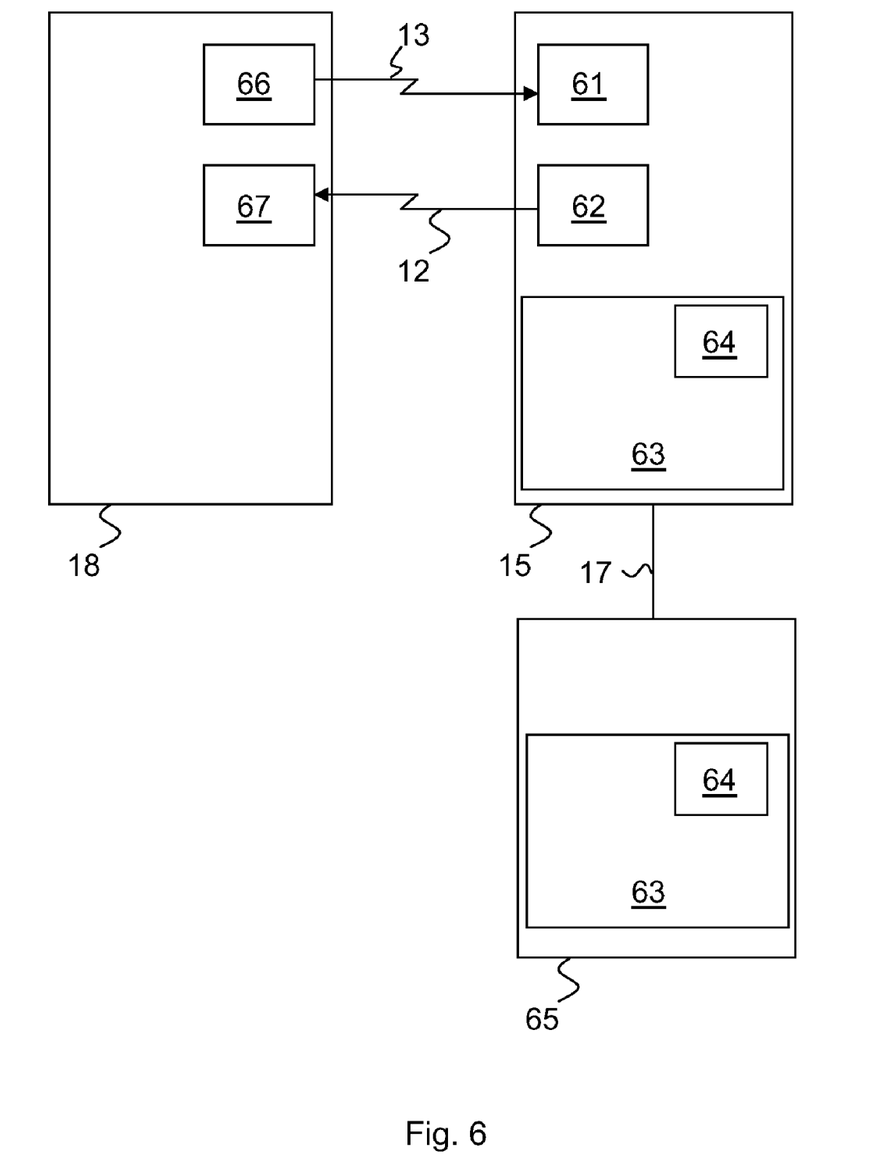
FIG. 6 is a simplified block diagram of an inventive user equipment and radio base station.

FIG. 6 is a block diagram showing a user equipment 18, a radio base station (RBS) 15, such as eNode B, and an operating and support system (OSS) 65. The shown communication network nodes (such as eNB and the OSS) being used for automatically tuning a physical random access channel configuration parameter in a communication network system comprising radio base stations 15 each serving at least one cell and with which user equipments 18 are communicating on uplink 13 and downlink 12 channels. The physical random access channel configuration parameter being used for defining the division of uplink resource blocks between PRACH and PUSCH.

The RBS 15 comprises a radio transmitter 62 and a receiver 61. The transmitter 62 is transmitting data to a receiver 67 of the user equipment 18 over a radio interface on the downlink channel 12. The receiver 61 is receiving data from the user equipment 18 on the uplink channel 13. The RBS 15 further comprises a processing unit 63 arranged to perform the steps of:

collecting load statistics on a random access channel and a physical uplink shared channel;

determining a number of random access channel opportunities required per time unit using said collected statistics;

selecting a new physical random access configuration parameter having said required number of random access channel opportunities per time unit;

replacing said original physical random access channel configuration parameter with said new physical random access channel configuration parameter According to some embodiments of the present invention, the processing unit comprises in order to collect load statistics an estimator 64 arranged to perform the steps of:

estimating a usage on said random access channel during a first pre-determined time interval;

estimating load on said random access channel by dividing said estimated random access channel usage with a number of random access opportunities in said first pre-determined time interval;

estimating a usage on said physical uplink shared channel during a second pre-determined time interval;

estimating load on said physical uplink shared channel by dividing said estimated physical uplink shared channel usage with a number of available resource blocks for said physical uplink shared channel over said second pre-determined time interval According to some embodiments, the processing unit 63 when determining said number of random access channel opportunities required per time unit is arranged to perform the steps of:

defining a ratio, $\gamma$, between said estimated load on said random access channel and said estimated load on said physical uplink shared channel;

if said defined ratio is less than a target threshold value, $\gamma_{target}$, minus an offset value, $\Delta$, then decreasing a required number of random access channel opportunities per time unit; else, if said ratio is more than said target threshold value, $\gamma_{target}$, plus said offset value, $\Delta$, then increasing said required number of random access channel opportunities per time unit; else, setting said required number of random access channel opportunities per time unit to be a current number of random access channel opportunities per time unit.

According to some embodiments, the processing unit 63 when selecting a new physical random access configuration parameter further is arranged to select a physical random access channel configuration parameter where said number of random access channel opportunities per time unit is non-overlapping in time with neighbouring cells.

According to some embodiments, the processing unit 63 when selecting a new physical random access configuration parameter further is arranged to estimate an interference level in sub-frames corresponding to said new physical random access configuration parameter, whereby the physical random access configuration parameter experiencing the lowest interference level is selected.

According to some embodiments, the processing unit 63 when selecting a new physical random access configuration parameter further is arranged to select a random configuration parameter among the ones having said required number of random access channel opportunities.

According to some embodiments, the processing unit 63 further is arranged to select an initial physical random access configuration parameter.

According to some embodiments, the selected initial physical random access configuration parameter is the parameter having the largest number of random access channel opportunities per time unit.

The user equipment 18 comprises a radio transmitter 66 arranged to transmit data packets to the receiver 61 of the RBS 15 over the radio interface on the uplink channel 13 and a receiver 67 arranged to receive data packets transmitted from the transmitter 62 of the RBS 15 on the downlink channel 12.

The OSS 65 is communicating with the RBS 15 via the interface 17 and optionally comprises a processing unit 63 as described above. The invention may be implemented in the eNB or in the OSS as described herein, but it may also be implemented in other communication network nodes as well.

It will be appreciated that at least some of the procedures described above are carried out repetitively as necessary to respond to the time-varying characteristics of the channel between the transmitter and the receiver. To facilitate understanding, many aspects of the invention are described in terms of sequences of actions to be performed by, for example, elements of a programmable computer system. It will be recognized that the various actions could be performed by specialized circuits (e.g. discrete logic gates interconnected to perform a specialized function or application-specific integrated circuits), by program instructions executed by one or more processors, or a combination of both.

Moreover, the invention can additionally be considered to be embodied entirely within any form of computer-readable storage medium having stored therein an appropriate set of instructions for use by or in connection with an instruction-execution system, apparatus or device, such as computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus or device. The computer-readable medium can be, for example but not limited to, an electronic, magnetic, optical, electro-magnetic, infrared, or semiconductor system, apparatus, device or propagation medium. More specific examples (a non-exhaustive list) of the computer-readable medium include an electrical connection having one or more wires, a portable computer diskette, a random access memory (RAM), a read only memory (ROM), an erasable programmable read only memory (EPROM or Flash memory), an optical fibre, and a portable compact disc read only memory (CD-ROM).

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

The invention claimed is:

1. A method of automatically tuning a physical random access channel configuration parameter in a communication network system comprising radio base stations each serving at least one cell and with which user equipments are communicating on uplink and downlink channels, said physical random access channel configuration parameter being used for defining the division of uplink resource blocks between a physical random access channel and a physical uplink shared channel, wherein the method comprises the iterative steps of:

collecting load statistics on a random access channel and said physical uplink shared channel;

determining a number of random access channel opportunities required per time unit by defining a ratio, $\gamma$, between said estimated load on said random access channel and said estimated load on said physical uplink shared channel;

when said defined ratio is less than a target threshold value, $\gamma_{target}$, minus an offset value, $\Delta$, decreasing a required number of random access channel opportunities per time unit; else, when said ratio is more than said target threshold value, $\gamma_{target}$, plus said offset value, $\Delta$, increasing said required number of random access channel opportunities per time unit; else, setting said required number of random access channel opportunities per time unit to be a current number of random access channel opportunities per time unit;

selecting a new physical random access channel configuration parameter having said required number of random access channel opportunities per time unit; and replacing an old physical random access channel configuration parameter with said selected new physical random access channel configuration parameter.

2. A method according to claim 1, wherein the step of collecting load statistics comprises the steps of:

estimating a usage on said random access channel during a first pre-determined time interval;

estimating load on said random access channel by dividing said estimated random access channel usage with a number of random access opportunities in said first pre-determined time interval;

estimating a usage on said physical uplink shared channel during a second pre-determined time interval; and estimating load on said physical uplink shared channel by dividing said estimated physical uplink shared channel usage with a number of available resource blocks for said physical uplink shared channel over said second pre-determined time interval.

3. A method according to claim 1, wherein the step of selecting a new physical random access configuration parameter comprises the step of selecting a physical random access channel configuration parameter where said number of random access channel opportunities per time unit is non-overlapping in time with neighbouring cells.

4. A method according to claim 1, wherein the step of selecting a new physical random access configuration parameter comprises the step of estimating an interference level in sub-frames corresponding to said new physical random access configuration parameter, whereby the physical random access configuration parameter experiencing the lowest interference level is selected.

5. A method according to claim 1, wherein the step of selecting a new physical random access configuration parameter comprises the step of selecting a random configuration parameter among the ones having said required number of random access channel opportunities.

6. A method according to claim 1, wherein the method further comprises the step of selecting an initial physical random access configuration parameter.

7. A communication network node for automatically tuning a physical random access channel configuration parameter in a communication network system comprising radio base stations each serving at least one cell and with which user equipments are communicating on uplink and downlink channels, said physical random access channel configuration parameter being used for defining the division of uplink resource blocks between a physical random access channel and a physical uplink shared channel, wherein the communication network node comprises a processing unit configured to iteratively perform the steps of:

collecting load statistics on a random access channel and said physical uplink shared channel;

determining a number of random access channel opportunities required per time unit by defining a ratio, $\gamma$, between said estimated load on said random access channel and said estimated load on said physical uplink shared channel;

when said defined ratio is less than a target threshold value, $\gamma_{target}$, minus an offset value, $\Delta$, decreasing a required number of random access channel opportunities per time unit; else, when said ratio is more than said target threshold value, $\gamma_{target}$, plus said offset value, $\gamma$, increasing said required number of random access channel opportunities per time unit; else, setting said required number of random access channel opportunities per time unit to be a current number of random access channel opportunities per time unit;

selecting a new physical random access channel configuration parameter having said required number of random access channel opportunities per time unit; and replacing said original physical random access channel configuration parameter with said new physical random access channel configuration parameter.

8. A communication network node according to claim 7, wherein said processing unit comprises an estimator which is in order to collect load statistics arranged to perform the steps of:

estimating a usage on said random access channel during a first pre-determined time interval;

estimating load on said random access channel by dividing said estimated random access channel usage with a number of random access opportunities in said first pre-determined time interval;

estimating a usage on said physical uplink shared channel during a second pre-determined time interval; and estimating load on said physical uplink shared channel by dividing said estimated physical uplink shared channel usage with a number of available resource blocks for said physical uplink shared channel over said second pre-determined time interval.

9. A communication network node according to claim 7, wherein said processing unit when selecting a new physical random access configuration parameter further is arranged to select a physical random access channel configuration parameter where said number of random access channel opportunities per time unit is non-overlapping in time with neighbouring cells.

10. A communication network node according to claim 7, wherein said processing unit when selecting a new physical random access configuration parameter further is arranged to estimate an interference level in sub-frames corresponding to said new physical random access configuration parameter, whereby the physical random access configuration parameter experiencing the lowest interference level is selected.

11. A communication network node according to claim 7, wherein said processing unit when selecting a new physical random access configuration parameter further is arranged to select a random configuration parameter among the ones having said required number of random access channel opportunities.

12. A communication network node according to claim 7, wherein said processing unit further is arranged to select an initial physical random access configuration parameter.

* * * * *

UNITED STATES PATENT AND TRADEMARK OFFICE
CERTIFICATE OF CORRECTION

PATENT NO. : 8,295,848 B2
APPLICATION NO. : 13/001032
DATED : October 23, 2012
INVENTOR(S) : Frenger et al.

Page 1 of 1

It is certified that error appears in the above-identified patent and that said Letters Patent is hereby corrected as shown below:

In Column 6, Line 66, delete "$\gamma = L_{RACH\ I}/L_{PUSCH}$." and insert -- $\gamma = L_{RACH}/L_{PUSCH}$. --, therefor.

Signed and Sealed this
Twelfth Day of February, 2013

Teresa Stanek Rea
*Acting Director of the United States Patent and Trademark Office*